Patented Mar. 24, 1953

2,632,210

UNITED STATES PATENT OFFICE 2,632,210

PERMEABLE LEATHER SUBSTITUTES AND METHODS OF MAKING

Arthur R. Olson, Wakefield, and Edward B. McMillan, Marblehead, Mass., assignors to United Shoe Machinery Corporation, Flemington, N. J., a corporation of New Jersey No Drawing. Application October 24, 1950, Serial No. 191,934

11 Claims. (Cl. 18—48)

This invention relates to porous sheet materials and particularly leather substitutes adapted for use in shoemaking and to methods for making the same.

The human skin is covered with sweat glands which continuously exude perspiration composed of water, salts and organic materials. These sweat glands are 2½ times as dense on the palms of the hands and soles of the feet as on the rest of the body and hence the feet give off perspiration at a high rate. When the feet are enclosed in shoes, the perspiration accumulates and, when not dissipated, breaks down chemically to form unpleasant smelling compounds. Likewise, accumulated perspiration may cause the skin of the feet to become tender and more susceptible to infection.

Leather has been considered a desirable material for use in making shoes because of its ability to transfer perspiration from the inner surface of a shoe to the outer surface, i. e. to "breathe." It is believed that in leather the transfer is carried out by a wicking action in which moisture is absorbed by the fibers of the leather, is passed along the fibers and is evaporated from the free surface of the leather. The fibrous structure of leather also enters into its ability to be lasted to a desired shape and to retain that shape.

Because of variations in the fibrous structure of leather taken from various portions of the hide, leather varies in strength, elasticity, stretchiness, porosity and appearance not only from one skin or hide to another but within each skin or hide. Good shoemaking in addition to its requirements of technical skill involves estimates by cutters and lasters as to characteristics of each leather part in a shoe.

Because of such factors as these, and on account of cost, numerous substitutes for leather have been proposed. In general these have been unsatisfactory in one or more factors. Almost universally, materials which have sufficient strength and wear resistance have been lacking in the ability to "breathe," or in tear resistance, or in the type of deformability which permits them to be lasted to a desired shape and to retain that shape elastically when subjected to stresses in actual use.

It is a feature of the present invention to provide a new tough, strong sheet material possessing a permeability particularly adapting it for dissipation of moisture from shoes, and possessing in addition the ability to be lasted and to elastically retain its shape.

It is a further feature to provide a novel method for making a permeable, tough, flexible sheet material for use in shoes.

According to the present invention there are combined a rubber with substantial proportions of one or more toughening resins, a curing agent, if required, and special blowing agents which operate, when the composition is heated, to form a permeable structure having exceptional tear strength and desirable lasting and other shoemaking characteristics.

Rubbers usable in the sheet material of the present invention include synthetic rubbery copolymers, preferably relatively firm materials such as the copolymers of butadiene and acrylonitrile containing from 20% to 45% acrylonitrile and the copolymers of butadiene and styrene containing from 20% to 60% styrene. Natural rubber may also be used.

The rubber is intimately mixed, for example by milling or combining in a Banbury mixer with a relatively hard resin, or a hardenable resin or mixture of such resins which toughen the rubbery material. Resins which have been used include high styrene content butadiene styrene copolymer resins, phenolic resins, cyclized rubbers, and styrene isobutylene copolymer resins. The relative proportions of the resins and rubber depends on the nature of the rubber and resin or resins combined and may be varied over a relatively wide range, but it has been found that from 50 to not more than 600 parts of hard or hardenable resin with 100 parts by weight of the rubber is about the practical limit.

Rubber-reinforcing phenolic resins such as the materials known as Durez 12315, Durez 12687, Durez 12686 and Durez 12707 produced by the Durez Plastics and Chemical Corporation, and Synvar RC–20H produced by the Synthane Corp., have been found useful particularly with the butadiene acrylonitrile copolymer rubber. These resins may be completely cured by addition of a sufficient amount of formaldehyde, e. g., as hexamethylene tetramine, but for the present sheet material it has been found that more satisfactory properties are obtained where only a limited amount, for example 20% to 80% of the quantity of aldehyde material recommended for curing, is used with the resin. These resins are preferably employed in the proportions of from 50 to 100 and preferably 50 to 75 parts by weight of resin to 100 parts of the copolymer rubber.

Styrene-butadiene copolymer resins containing from 70% to 85% styrene are particularly effective for toughening butadiene styrene copolymer rubbery material. Among these resins are Darex Copolymer #3 containing approximately 70% styrene, manufactured by the Dewy and Almy Chemical Co.; Marbon S containing approximately 85% styrene, manufactured by the Marbon Corporation; and Goodyear P1799 and Pliolite 5-7 which contain about 70% styrene, manufactured by the Goodyear Tire and Rubber Co. It has been found that excellent products are obtained by the combination of from 100 to 300 parts by weight of a high styrene content copolymer resin, such as Marbon S, and from 300 to 100 parts by weight of an intermediate styrene content copolymer, such as Darex #3, with 100 parts by weight of butadiene styrene rubber.

These resins may be partially replaced or may be extended by addition of such resins as Vinsol, and polystyrene.

Mineral fillers such as asbestos fiber or the finely divided hydrated silica material known as Hi-Sil may be added to the mixture in quantity up to 100 parts by weight based on 100 parts by weight of the rubber. It has been found that inclusion of fillers reduces the upper limit of percentage of hard resin by approximately the amount of the addition.

After mixing of the rubber and resin or resins, the mixture is cooled if necessary; and the curing agent, if used, and the special blowing agent are added. The special blowing agents which cooperate with the rubber-resin mixture to give a tough, permeable, tear-resistant sheet are water soluble salts which decompose when heated with evolution of gas to effect blowing. Ammonium sulfamate, preferably containing from 10% by weight up to an equal weight of added sulfamic acid has been found particularly effective in forming permeable products having exceptional toughness. Ammonium acetate and ammonium formate have also been found useful as blowing agents. These blowing agents are employed in the ratio of from 75 to 100 parts with 100 parts of copolymer rubber. If desired, minor proportions of auxiliary blowing agents such as diazoaminobenzene or finely divided sodium bicarbonate may be employed along with the special blowing agents. It is believed that the acids developed by decomposition of the ammonium sulfamate, ammonium acetate or ammonium formate retard sealing together of ruptured bubble walls in the expanded rubbery material until curing is complete to form an improved porous structure having desirable high tear strength.

Any of the known vulcanization agent systems may be used. However, it has been found important to effect a rapid vulcanization to obtain high tear strength. Particularly with a butadiene-acrylonitrile copolymer and phenolic resin mixture it has been found that the higher tear strength is obtained where vulcanization of the copolymer reaches its completion before curing of the resin is complete.

The mixture of rubber, resin, curing agent if employed, and blowing agent is formed into thin sheets preferably by sheeting out on a mill and is then subjected to heat to expand the material and form open pores and to cure the sheet. After curing, the porous sheet is immersed in water to leach out soluble materials. The leaching may vary from soaking overnight in tepid water to a hot, e. g. boiling water leach for a period of three quarters of an hour. The rate of leaching may be improved by adding a penetrant such as Tergitol to the leach water and by mechanical agitation.

The product obtained after drying the leached sheet possesses strength and flexibility comparable to leather and is useful in shoemaking. The sheet is uniform throughout and the problem of cutting shoe parts is simplified since the cuts may be laid out for most efficient utilization of the area.

The following examples of the manufacture of porous sheet materials are presented as of assistance in understanding the invention. It is to be understood that the invention is not limited to the combinations of materials and proportions nor to the procedural details recited in the examples:

*Example I.*—A milled mixture was prepared by plasticizing on a mill at 160° to 175° F. 100 parts of a copolymer comprising 85% styrene and 15% butadiene, adding on the mill 160 parts of a copolymer comprising 70% styrene and 30% butadiene and thereafter adding 60 parts of a rubbery copolymer of 30% styrene and 70% butadiene. The mixture was cooled on the mill to a temperature of about 120° F. and there was then added 11 parts of zinc oxide, 3.3 parts of sulphur, 3.3 parts of Oltax accelerator (benzothiazyl disulfide) and 0.4 part of Cumate accelerator (a proprietary copper compound obtained from the R. T. Vanderbilt Co.). Finally there was added the novel blowing agent, 83.5 parts of ammonium sulfamate, and 3 parts of diazo amino benzene. The mixture was then sheeted out on the mill to a thickness of 0.12″. This sheet material was placed in a closed mold 0.18″ in depth and heated for 20 minutes at 150° C. to effect curing and blowing of the material. The cured material was then removed from the mold and soaked for 2½ hours in boiling water containing a penetrant, Tergitol (a sodium alkyl sulfate). The soaked material was then removed and dried at 105° C. to form a tough, flexible sheet material possessing micro porosity. The material was satisfactory for insoles for shoes where its permeability was such that the foot, the stocking and the insole of the shoe remained dry and comfortable on wear under conditions such that a leather insole became saturated with water.

*Example II.*—Fifty parts of a copolymer of butadiene and styrene comprising 85% styrene was plasticized on a mill at 160° to 175° F. The mill was then cooled and fifty parts of a butadiene acrylonitrile copolymer rubber comprising 33% acrylonitrile was added to the plasticized butadiene styrene copolymer. After intimate mixture on the mill, there were added, based on 100 parts of the mixture, two parts of sulphur, 15 parts of zinc oxide and 50 parts of ammonium acetate. Thereafter 0.5 part of mercapto benzothiazyl, 0.5 part of benzothiazyl disulfide and 0.25 part of tetraethyl thiuram disulfide were added. This compound was sheeted to a thickness of 0.07″ and placed in a mold having a thickness of 0.1″. The mold was closed and heated for twenty minutes at 150° C. to effect curing and blowing of the compound. The material was soaked and dried according to the procedure set forth in Example I and formed a tough porous material. It was found that the dry sheet material obtained was as permeable as a piece of upper leather ⅓ as thick and that the sheet material had a Scott tensile test value of 960 lbs. per square inch.

*Example III.*—The following components were intimately mixed on a rubber mill which was maintained at 165° F. until the rubber and resin combined and then cooled to 120° prior to addition of the components other than rubber:

| | Parts by weight |
|---|---|
| Butadiene-acrylonitrile copolymer containing 33% acrylonitrile | 100 |
| Rubber reinforcing phenol aldehyde resin (Durez 1375) | 70 |
| Ammonium sulfamate | 10 |
| Lead oxide | 5 |
| Benzothiazyl disulfide (Altax) | 1 |
| Stearic acid | 1 |
| Rubber accelerator, Ethyl Selenac (selenium diethyl dithiocarbamate) | 3.5 |

The above mixture was divided into a number of parts with which were combined on the mill proportions of hexamethylene tetramine as follows:

Mixture (a)—3.5% of hexamethylene tetramine based on the weight of the phenolic resin.

Mixture (b)—7.0% of hexamethylene tetramine based on the weight of the phenolic resin.

Mixture (c)—10.5% of hexamethylene tetramine based on the weight of the phenolic resin.

Mixture (d)—a control sample containing no hexamethylene tetramine.

These various samples were sheeted out, heated in a mold to blow and cure them, leached and dried according to the procedure set forth in Example I. The cured samples were then subjected to a notch tear test to determine the tear strength. Sample (a) had a tear strength of approximately 275 lbs. per inch of thickness, sample (b) had a tear strength of approximately 225 lbs. per inch of thickness, while sample (c) had a tear strength of approximately 60 lbs. per inch of thickness and the control had a tear strength of approximately 95 lbs. per inch of thickness. The manufacturer of the phenolic resin indicates that 10% of hexamethylene tetramine by weight based on the weight of the phenolic resin is needed to cure the resin. It will be observed that the tear strengths of compositions contain 3.5% to 7.0% of hexamethylene tetramine, i. e. 35% to 70% of the quantity of hexamethylene tetramine normally used for complete cure, are substantially higher than the tear strengths of compositions containing no curing agent and compositions containing the full amount of curing agent.

Having described our invention, what we claim as new and desire to secure by Letters Patent of the United States is:

1. The method of forming flexible, permeable sheet material which comprises intimately mixing 100 parts by weight of a rubber, from 50 to 600 parts by weight of a compatible, hard, resinous material, and from 75 to 100 parts by weight of a finely divided salt from the group consisting of ammonium sulfamate, ammonium formate and ammonium acetate, said salt being decomposable by heat with evolution of gas and formation of a water soluble acidic residue, forming the mixture into a sheet, heating the sheet to cause the salt to decompose and give off gas to expand the material, and leaching out the soluble residue.

2. The method of forming a tough, flexible, permeable sheet material which comprises intimately mixing 100 parts by weight of a butadiene-acrylonitrile copolymer rubber containing from 20% to 45% acrylonitrile, from 50 to 100 parts by weight of a compatible thermosetting phenol-aldehyde resin, and from 75 to 100 parts by weight of a finely divided ammonium salt from the group consisting of ammonium sulfamate, ammonium formate and ammonium acetate, said salt being decomposable by heat with evolution of gas and formation of a water soluble acidic residue, forming the mixture into a sheet, heating the sheet to cause interaction between the copolymer rubber and resinous product and to cause the salt to decompose and give off gas to expand the material, and leaching out the soluble residue.

3. The method of forming a tough, flexible, permeable sheet material which comprises intimately mixing 100 parts by weight of a butadiene-styrene copolymer rubber containing from 20% to 60% of styrene, from 100 to 300 parts by weight of a resinous copolymer of a butadiene and styrene containing 70% styrene, from 100 to 300 parts by weight of a butadiene-styrene copolymer resin containing 85% styrene, and from 75 to 100 parts by weight of a finely divided ammonium salt from the group consisting of ammonium sulfamate, ammonium formate and ammonium acetate, said salt being decomposable by heat with evolution of gas and formation of a water soluble acidic residue, forming the mixture into a sheet, heating the sheet to cause evolution of gas from the ammonium salt to expand the material, and leaching the resulting sheet with water to remove the soluble residue.

4. The method of forming a tough, flexible, permeable sheet material which comprises intimately mixing 100 parts by weight of a butadiene-acrylonitrile copolymer rubber containing from 20% to 45% acrylonitrile, from 50 to 100 parts by weight of a compatible thermosetting phenol-aldehyde resin product, from 75 to 100 parts by weight of a finely divided ammonium salt from the group consisting of ammonium sulfamate, ammonium formate and ammonium acetate, said salt being decomposable by heat with evolution of gas and formation of a water soluble acidic residue, and a vulcanizing agent for the copolymer rubber, forming the mixture into a sheet, heating the sheet to cause interaction between the copolymer rubber and resinous product and to cause the salt to decompose and to give off gas to expand the rubber, continuing heating to vulcanize the copolymer rubber and leaching out the soluble residue.

5. The method of forming a tough, flexible, permeable sheet material which comprises intimately mixing 100 parts by weight of a butadiene-acrylonitrile copolymer rubber containing from 20% to 45% acrylonitrile, from 50 to 100 parts by weight of a compatible thermosetting phenol-aldehyde resin, from 75 to 100 parts by weight of finely divided ammonium sulfamate, and a vulcanizing agent for the copolymer rubber, forming the mixture into a sheet, heating the sheet to cause interaction between the copolymer rubber and resinous product and to cause the sulfamate to decompose and to give off gas to expand the rubber, continuing heating to vulcanize the copolymer rubber and leaching out the soluble residue.

6. The method of forming a tough, flexible, permeable sheet material which comprises intimately mixing 100 parts by weight of a butadiene-acrylonitrile copolymer rubber containing from 20% to 45% acrylonitrile, from 50 to 100 parts by weight of a compatible thermosetting phenol-aldehyde resin, a vulcanizing agent for the copolymer rubber, from 75 to 100 parts by weight of finely divided ammonium sulfamate, and from 10% to 100% by weight of sulfamic acid based on the weight of the ammonium sulfamate, forming the mixture into a sheet, heating the sheet to cause interaction between the copolymer rubber and resinous product and to cause the sulfamate to decompose and to give off gas to expand the rubber, continuing heating to vulcanize the copolymer rubber and leaching out the soluble residue.

7. The method of forming a tough, flexible, permeable sheet material which comprises intimately mixing 100 parts by weight of a butadiene-styrene copolymer rubber containing from 20% to 60% of styrene, from 100 to 300 parts by weight of a resinous copolymer of a butadiene and styrene containing 70% styrene, from 100 to 300 parts by weight of a butadiene-styrene copolymer resin containing 85% styrene, from 75 to 100 parts by weight of a finely divided ammonium salt from the group consisting of ammonium sulfamate, ammonium formate and ammonium acetate, said salt being decomposable by heat with evolution of gas and formation of a water soluble acidic residue, and a vulcanizing agent for the copolymer rubber, forming the mixture into a sheet, heating the sheet to cause evolution of gas from the ammonium salt to expand the material, continuing heating to vulcanize the copolymer rubber, and leaching the resulting sheet with water to remove the soluble residue.

8. The method of forming a tough, flexible, permeable sheet material which comprises intimately mixing 100 parts by weight of a butadiene-styrene copolymer rubber containing from 20% to 60% of styrene, from 100 to 300 parts by weight of a resinous copolymer of a butadiene and styrene containing 70% styrene, from 100 to 300 parts by weight of a butadiene-styrene copolymer resin containing 85% styrene, from 75 to 100 parts by weight of finely divided ammonium sulfamate, and a vulcanizing agent for the copolymer rubber, forming the mixture into a sheet, heating the sheet to cause evolution of gas from the ammonium sulfamate to expand the material, continuing heating to vulcanize the copolymer rubber, and leaching the resulting sheet with water to remove the soluble residue.

9. The method of forming a tough, flexible, permeable sheet material which comprises intimately mixing 100 parts by weight of a butadiene-styrene copolymer rubber containing from 20% to 60% of styrene, from 100 to 300 parts by weight of a resinous copolymer of a butadiene and styrene containing 70% styrene, from 100 to 300 parts by weight of a butadiene-styrene copolymer resin containing 85% styrene, from 75 to 100 parts by weight of finely divided ammonium sulfamate, from 10% to 100% by weight of sulfamic acid based on the weight of the ammonium sulfamate, and a vulcanizing agent for the copolymer rubber, forming the mixture into a sheet, heating the sheet to cause evolution of gas from the ammonium sulfamate to expand the material, continuing heating to vulcanize the copolymer rubber, and leaching the resulting sheet with water to remove the soluble residue.

10. The tough, flexible, permeable sheet material obtained by intimately mixing 100 parts by weight of a butadiene-acrylonitrile copolymer rubber containing from 20% to 45% acrylonitrile, from 50 to 100 parts by weight of a compatible curable phenol-aldehyde resin together with from 35% to 70% of the amount of curing agent required to complete the curing of said resin, a vulcanizing agent for the copolymer rubber, from 75 to 100 parts by weight of finely divided ammonium sulfamate, and from 10% to 100% by weight of sulfamic acid based on the weight of the ammonium sulfamate, forming the mixture into a sheet, heating the sheet to cause interaction between the copolymer rubber and resinous product and to cause the sulfamate to decompose and to give off gas to expand the rubber, continuing heating to vulcanize the copolymer rubber and leaching out the soluble residue.

11. The tough, flexible, porous sheet material obtained by intimately mixing 100 parts by weight of a butadiene-styrene copolymer rubber containing 20% to 60% of styrene, from 100 to 300 parts by weight of a resinous copolymer of a butadiene and styrene containing 70% styrene, from 100 to 300 parts by weight of a butadiene-styrene copolymer resin containing 85% styrene, from 70 to 100 parts by weight of finely divided ammonium sulfamate, from 10% to 100% by weight of sulfamic acid based on the weight of the ammonium sulfamate, and a vulcanizing agent for the copolymer rubber, forming the mixture into a sheet, heating the sheet to cause evolution of gas from the ammonium sulfamate to expand the material, continuing heating to vulcanize the copolymer rubber, and leaching the resulting sheet with water to remove the soluble residue.

ARTHUR R. OLSON.
EDWARD B. McMILLAN.

REFERENCES CITED

The following references are of record in the file of this patent:

UNITED STATES PATENTS

| Number | Name | Date |
|---|---|---|
| 2,383,110 | Cooper | Aug. 21, 1945 |
| 2,459,439 | Groten et al. | Jan. 18, 1949 |